US008596550B2

(12) United States Patent
Steinberg et al.

(10) Patent No.: US 8,596,550 B2
(45) Date of Patent: Dec. 3, 2013

(54) SYSTEM, METHOD AND APPARATUS FOR IDENTIFYING MANUAL INPUTS TO AND ADAPTIVE PROGRAMMING OF A THERMOSTAT

(75) Inventors: John Douglas Steinberg, Millbrae, CA (US); Scott Douglas Hublou, Redwood City, CA (US); Leo Cheung, Sunnyvale, CA (US)

(73) Assignee: EcoFactor, Inc., Millbrae, CA (US)

( * ) Notice: Subject to any disclaimer, the term of this patent is extended or adjusted under 35 U.S.C. 154(b) by 866 days.

(21) Appl. No.: 12/778,052

(22) Filed: May 11, 2010

(65) Prior Publication Data

US 2010/0308119 A1 Dec. 9, 2010

Related U.S. Application Data

(60) Provisional application No. 61/215,999, filed on May 12, 2009.

(51) Int. Cl.
*G05D 23/00* (2006.01)

(52) U.S. Cl.
USPC .................. 236/1 C; 236/51; 236/94; 62/161; 700/278

(58) Field of Classification Search
USPC .............. 236/1 C, 46 R, 51, 94; 62/161, 163; 700/276, 278
See application file for complete search history.

(56) References Cited

U.S. PATENT DOCUMENTS

| 4,136,732 A | 1/1979 | Demaray et al. |
| 4,341,345 A | 7/1982 | Hammer et al. |
| 4,403,644 A | 9/1983 | Hebert |
| 4,475,685 A | 10/1984 | Grimado et al. |
| 4,655,279 A | 4/1987 | Harmon |
| 4,674,027 A | 6/1987 | Beckey |
| 4,897,798 A * | 1/1990 | Cler .............................. 700/276 |
| 5,244,146 A | 9/1993 | Jefferson et al. |
| 5,270,952 A | 12/1993 | Adams et al. |
| 5,314,004 A | 5/1994 | Strand et al. |

(Continued)

FOREIGN PATENT DOCUMENTS

| EP | 0415747 | 3/1991 |
| KR | 10-1994-0011902 | 6/1994 |
| KR | 10-2000-0059532 | 10/2000 |

OTHER PUBLICATIONS

Honeywell, W7600/W7620 Controller Reference Manual, HWO021207, Oct. 1992.

(Continued)

*Primary Examiner* — Marc Norman
(74) *Attorney, Agent, or Firm* — Knobbe, Martens, Olson & Bear, LLP

(57) ABSTRACT

Systems and methods are disclosed for incorporating manual changes to the setpoint for a thermostatic controller into long-term programming of the thermostatic controller. For example, one or more of the exemplary systems compares the actual setpoint at a given time for the thermostatic controller to an expected setpoint for the thermostatic controller in light of the scheduled programming. A determination is then made as to whether the actual setpoint and the expected setpoint are the same or different. Furthermore, a manual change to the actual setpoint for the thermostatic controller is compared to previously recorded setpoint data for the thermostatic controller. At least one rule is then applied for the interpretation of the manual change in light of the previously recorded setpoint data.

23 Claims, 11 Drawing Sheets

(56) References Cited

U.S. PATENT DOCUMENTS

| | | | |
|---|---|---|---|
| 5,462,225 | A | 10/1995 | Massara et al. |
| 5,544,036 | A | 8/1996 | Brown et al. |
| 5,555,927 | A | 9/1996 | Shah |
| 5,572,438 | A | 11/1996 | Ehlers et al. |
| 5,682,949 | A | 11/1997 | Ratcliffe et al. |
| 5,717,609 | A | 2/1998 | Packa et al. |
| 5,818,347 | A | 10/1998 | Dolan et al. |
| 5,977,964 | A | 11/1999 | Williams et al. |
| 6,115,713 | A | 9/2000 | Pascucci et al. |
| 6,145,751 | A | 11/2000 | Ahmed |
| 6,178,362 | B1 | 1/2001 | Woolard et al. |
| 6,260,765 | B1 | 7/2001 | Natale et al. |
| 6,351,693 | B1 | 2/2002 | Monie |
| 6,400,956 | B1 | 6/2002 | Richton |
| 6,400,996 | B1 | 6/2002 | Hoffberg et al. |
| 6,437,692 | B1 | 8/2002 | Petite et al. |
| 6,454,177 | B1* | 9/2002 | Sasao et al. .............. 236/46 R |
| 6,478,233 | B1 | 11/2002 | Shah |
| 6,480,803 | B1 | 11/2002 | Pierret et al. |
| 6,483,906 | B1 | 11/2002 | Lggulden et al. |
| 6,536,675 | B1 | 3/2003 | Pesko et al. |
| 6,542,076 | B1 | 4/2003 | Joao |
| 6,549,130 | B1 | 4/2003 | Joao |
| 6,574,537 | B2 | 6/2003 | Kipersztok et al. |
| 6,580,950 | B1 | 6/2003 | Johnson |
| 6,594,825 | B1 | 7/2003 | Goldschmidtlki et al. |
| 6,595,430 | B1 | 7/2003 | Shah |
| 6,598,056 | B1 | 7/2003 | Hull et al. |
| 6,619,555 | B2 | 9/2003 | Rosen |
| 6,622,097 | B2 | 9/2003 | Hunter |
| 6,622,115 | B1 | 9/2003 | Brown et al. |
| 6,622,925 | B2 | 9/2003 | Carner et al. |
| 6,622,926 | B1 | 9/2003 | Sartain et al. |
| 6,628,997 | B1 | 9/2003 | Fox et al. |
| 6,633,823 | B2 | 10/2003 | Bartone et al. |
| 6,643,567 | B2 | 11/2003 | Kolk et al. |
| 6,671,586 | B2 | 12/2003 | Davis et al. |
| 6,695,218 | B2 | 2/2004 | Fleckenstein |
| 6,726,113 | B2 | 4/2004 | Guo |
| 6,731,992 | B1 | 5/2004 | Ziegler |
| 6,734,806 | B1 | 5/2004 | Cratsley |
| 6,772,052 | B1 | 8/2004 | Amundsen |
| 6,785,592 | B1 | 8/2004 | Smith |
| 6,785,630 | B2 | 8/2004 | Kolk |
| 6,789,739 | B2 | 9/2004 | Rosen |
| 6,853,959 | B2 | 2/2005 | Ikeda et al. |
| 6,868,293 | B1 | 3/2005 | Schurr |
| 6,868,319 | B2 | 3/2005 | Kipersztok et al. |
| 6,882,712 | B1 | 4/2005 | Iggulden et al. |
| 6,889,908 | B2 | 5/2005 | Crippen et al. |
| 6,891,838 | B1 | 5/2005 | Petite et al. |
| 6,912,429 | B1 | 6/2005 | Bilger |
| 6,991,029 | B2 | 1/2006 | Orfield et al. |
| 7,009,493 | B2 | 3/2006 | Howard et al. |
| 7,031,880 | B1 | 4/2006 | Seem et al. |
| 7,039,532 | B2 | 5/2006 | Hunter |
| 7,061,393 | B2 | 6/2006 | Buckingham et al. |
| 7,089,088 | B2 | 8/2006 | Terry et al. |
| 7,130,719 | B2 | 10/2006 | Ehlers et al. |
| 7,130,832 | B2 | 10/2006 | Bannai et al. |
| H2176 | H | 12/2006 | Meyer et al. |
| 7,167,079 | B2 | 1/2007 | Smyth et al. |
| 7,187,986 | B2 | 3/2007 | Johnson et al. |
| 7,205,892 | B2 | 4/2007 | Luebke et al. |
| 7,215,746 | B2 | 5/2007 | Iggulden et al. |
| 7,216,015 | B2 | 5/2007 | Poth |
| 7,231,424 | B2 | 6/2007 | Bodin et al. |
| 7,232,075 | B1 | 6/2007 | Rosen |
| 7,242,988 | B1 | 7/2007 | Hoffberg et al. |
| 7,260,823 | B2 | 8/2007 | Schlack et al. |
| 7,356,384 | B2 | 4/2008 | Gull et al. |
| 7,483,964 | B1 | 1/2009 | Jackson et al. |
| 7,644,869 | B2 | 1/2010 | Hoglund et al. |
| 7,784,704 | B2 | 8/2010 | Harter |
| 7,848,900 | B2 | 12/2010 | Steinberg et al. |
| 7,894,943 | B2 | 2/2011 | Sloup et al. |
| 7,908,116 | B2 | 3/2011 | Steinberg et al. |
| 7,908,117 | B2 | 3/2011 | Steinberg et al. |
| 8,010,237 | B2 | 8/2011 | Cheung et al. |
| 8,019,567 | B2 | 9/2011 | Steinberg et al. |
| 8,090,477 | B1 | 1/2012 | Steinberg |
| 8,131,497 | B2 | 3/2012 | Steinberg et al. |
| 8,131,506 | B2 | 3/2012 | Steinberg et al. |
| 8,180,492 | B2 | 5/2012 | Steinberg |
| 8,340,826 | B2 | 12/2012 | Steinberg |
| 8,457,797 | B2 | 6/2013 | Imes et al. |
| 2003/0040934 | A1 | 2/2003 | Skidmore et al. |
| 2004/176880 | A1 | 9/2004 | Obradovich et al. |
| 2005/0222889 | A1 | 10/2005 | Lai et al. |
| 2005/0288822 | A1 | 12/2005 | Rayburn |
| 2006/0045105 | A1 | 3/2006 | Dobosz et al. |
| 2006/0214014 | A1 | 9/2006 | Bash et al. |
| 2007/0043477 | A1 | 2/2007 | Ehlers et al. |
| 2007/0045431 | A1 | 3/2007 | Chapman et al. |
| 2007/0146126 | A1 | 6/2007 | Wang |
| 2008/0083234 | A1 | 4/2008 | Krebs et al. |
| 2008/0198549 | A1 | 8/2008 | Rasmussen et al. |
| 2008/0281472 | A1 | 11/2008 | Podgorny et al. |
| 2009/0052859 | A1 | 2/2009 | Greenberger et al. |
| 2009/0099699 | A1 | 4/2009 | Steinberg et al. |
| 2009/0125151 | A1 | 5/2009 | Steinberg et al. |
| 2009/0240381 | A1 | 9/2009 | Lane |
| 2009/0281667 | A1 | 11/2009 | Masui et al. |
| 2010/0019052 | A1 | 1/2010 | Yip |
| 2010/0070086 | A1 | 3/2010 | Harrod et al. |
| 2010/0070089 | A1 | 3/2010 | Harrod et al. |
| 2010/0070093 | A1 | 3/2010 | Harrod et al. |
| 2010/0156608 | A1 | 6/2010 | Bae et al. |
| 2010/0162285 | A1 | 6/2010 | Cohen et al. |
| 2010/0211224 | A1 | 8/2010 | Keeling et al. |
| 2010/0235004 | A1 | 9/2010 | Thind |
| 2010/0282857 | A1 | 11/2010 | Steinberg |
| 2010/0289643 | A1 | 11/2010 | Trundle et al. |
| 2010/0308119 | A1 | 12/2010 | Steinberg et al. |
| 2010/0318227 | A1 | 12/2010 | Steinberg et al. |
| 2011/0031323 | A1 | 2/2011 | Nold et al. |
| 2011/0046792 | A1 | 2/2011 | Imes et al. |
| 2011/0046798 | A1 | 2/2011 | Imes et al. |
| 2011/0046799 | A1 | 2/2011 | Imes et al. |
| 2011/0046800 | A1 | 2/2011 | Imes et al. |
| 2011/0046801 | A1 | 2/2011 | Imes et al. |
| 2011/0051823 | A1 | 3/2011 | Imes et al. |
| 2011/0054699 | A1 | 3/2011 | Imes et al. |
| 2011/0054710 | A1 | 3/2011 | Imes et al. |
| 2011/0173542 | A1 | 7/2011 | Imes et al. |
| 2011/0202185 | A1 | 8/2011 | Imes et al. |
| 2011/0214060 | A1 | 9/2011 | Imes et al. |
| 2011/0224838 | A1 | 9/2011 | Imes et al. |
| 2011/0246898 | A1 | 10/2011 | Imes et al. |
| 2011/0290893 | A1 | 12/2011 | Steinberg |
| 2011/0307101 | A1 | 12/2011 | Imes et al. |
| 2011/0307103 | A1 | 12/2011 | Cheung et al. |
| 2012/0023225 | A1 | 1/2012 | Imes et al. |
| 2012/0046859 | A1 | 2/2012 | Imes et al. |
| 2012/0064923 | A1 | 3/2012 | Imes et al. |
| 2012/0065935 | A1 | 3/2012 | Steinberg et al. |
| 2012/0072033 | A1 | 3/2012 | Imes et al. |
| 2012/0086562 | A1 | 4/2012 | Steinberg |
| 2012/0093141 | A1 | 4/2012 | Imes et al. |
| 2012/0101637 | A1 | 4/2012 | Imes et al. |
| 2012/0135759 | A1 | 5/2012 | Imes et al. |
| 2012/0158350 | A1 | 6/2012 | Steinberg et al. |
| 2012/0215725 | A1 | 8/2012 | Imes et al. |
| 2012/0221151 | A1 | 8/2012 | Steinberg |
| 2012/0221294 | A1 | 8/2012 | Steinberg et al. |
| 2012/0221718 | A1 | 8/2012 | Imes et al. |
| 2012/0252430 | A1 | 10/2012 | Imes et al. |
| 2012/0324119 | A1 | 12/2012 | Imes et al. |
| 2013/0053054 | A1 | 2/2013 | Lovitt et al. |
| 2013/0054758 | A1 | 2/2013 | Imes et al. |
| 2013/0054863 | A1 | 2/2013 | Imes et al. |
| 2013/0060387 | A1 | 3/2013 | Imes et al. |
| 2013/0144453 | A1 | 6/2013 | Subbloie |
| 2013/0167035 | A1 | 6/2013 | Imes et al. |

(56) References Cited

U.S. PATENT DOCUMENTS

OTHER PUBLICATIONS

Wetter, et al., A comparison of deterministic and probabilistic optimization algorithms for nonsmooth simulation-based optimization., Building and Environment 39, 2004, pp. 989-999.

U.S. Appl. No. 13/523,697, filed Jun. 14, 2012, Hublou, et al.

U.S. Appl. No. 13/725,447, filed Dec. 21, 2012, Steinberg, John Douglas.

Bourhan, et al., "Dynamic model of an HVAC system for control analysis", Elsevier 2004.

Emerson Climate Technologies, "Network Thermostat for E2 Building Controller Installation and Operation Manual", 2007.

Johnson Controls, "T600HCx-3 Single-Stage Thermostats", 2006.

Written Opinion and Search Report for PCT/US2011/032537, dated Dec. 12, 2011.

Comverge SuperStat Flyer, prior to Jun. 28, 2007.

Control4 Wireless Thermostat Brochure, 2006.

Cooper Power Systems Web Page, 2000-2009.

Enernoc Web Page, 2004-2009.

Enerwise Website, 1999-2009.

Honeywell Programmable Thermostat Owner's Guide, www.honeywell.com/yourhome, 2004.

Pier, Southern California Edison, Demand Responsive Control of Air Conditioning via Programmable Communicating; Feb. 14, 2006.

Proliphix Thermostat Brochure, prior to Jun. 2007.

Arens, et al., "How Ambient Intelligence Will Improve Habitability and Energy Efficiency in Buildings", 2005, research paper, Center for the Built Environment, Controls and Information Technology.

Johnson Controls, Touch4 building automation system brochure, 2007.

Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.

Lin, et al., "Multi-Sensor Single-Actuator Control of HVAC Systems", 2002 Communicating Thermostats Draft Report.

Wang, et al., "Opportunities to Save Energy and Improve Comfort by Using Wireless Sensor Networks in Buildings," (2003), Center for Environmental Design Research.

Wetter, et al., "A comparison of deterministic and probabilistic optimization algorithms for nonsmooth simulation-based optimization", Building and Environment 39, 2004, pp. 989-999.

Brush, et al., Preheat—Controlling Home Heating with Occupancy Prediction, 2013.

Gupta, et al., A Persuasive GPS-Controlled Thermostat System, MIT, 2008.

Gupta, Adding GPS-Control to Traditional Thermostats: An Exploration of Potential Energy Savings and Design Challenges, MIT, 2009.

Krumm, et al., Learning Time-Based Presence Probabilities, Jun. 2011.

Scott, et al., Home Heating Using GPS-Based Arrival Prediction, 2010.

\* cited by examiner

FIG. 10

| Time | Temperature | | Outside Conditions | | | | | Inside Conditions | | | | | | |
|---|---|---|---|---|---|---|---|---|---|---|---|---|---|---|
| (hh24:mm) | Inside Temp. | Outside Temp. | Conditions | Humidity | Pressure | Wind Speed | Wind Direction | Cool Setting | Heat Setting | Hold Mode | Schd Setting | Schd Cool | Schd Heat | Hvac State | Hvac Mode |
| 2009/04/10 11:00 | 69.70 | 54.00 | Mostly Cloudy | 74% | 29.89in/ 1012.1hPa Steady | 1.0mph 1.6kph | SE | 80.00 | 71.00 | Off | Out/Day | 80.00 | 65.00 | Heat | Heat |
| 2009/04/10 11:01 | 69.69 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:02 | 69.60 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:03 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:04 | 69.70 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:05 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:06 | 69.80 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:07 | 69.80 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:08 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:09 | 70.00 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:10 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |

SYSTEM, METHOD AND APPARATUS FOR IDENTIFYING MANUAL INPUTS TO AND ADAPTIVE PROGRAMMING OF A THERMOSTAT

CROSS-REFERENCE TO RELATED APPLICATIONS

This application claims priority to Provisional Application No. 61/215,999, filed May 12, 2009, the entirety of which is incorporated herein by reference and is to be considered part of this specification.

BACKGROUND OF THE INVENTION

Field of the Invention

Programmable thermostats have been available for more than 20 years. Programmable thermostats offer two types of advantages as compared to non-programmable devices. On the one hand, programmable thermostats can save energy in large part because they automate the process of reducing conditioning during times when the space is unoccupied, or while occupants are sleeping, and thus reduce energy consumption.

On the other hand, programmable thermostats can also enhance comfort as compared to manually changing setpoints using a non-programmable thermostat. For example, during the winter, a homeowner might manually turn down the thermostat from 70 degrees F. to 64 degrees when going to sleep and back to 70 degrees in the morning. The drawback to this approach is that there can be considerable delay between the adjustment of the thermostat and the achieving of the desired change in ambient temperature, and many people find getting out of bed, showering, etc. in a cold house unpleasant. A programmable thermostat allows homeowners to anticipate the desired result by programming a pre-conditioning of the home. So, for example, if the homeowner gets out of bed at 7 AM, setting the thermostat to change from the overnight setpoint of 64 degrees to 70 at 6 AM can make the house comfortable when the consumer gets up. The drawback to this approach is that the higher temperature will cost more to maintain, so the increase in comfort is purchased at the cost of higher energy usage.

But all of the advantages of a programmable thermostat depend on the match between the preferences of the occupants and the actual settings employed. If, for example, the thermostat is set to warm up the house on winter mornings at 7 AM, but the homeowner gets up at 5:30, the homeowner is likely to be dissatisfied. If a homeowner has programmed her thermostat to cool down the house at 5 PM each afternoon based on the assumption that she will come home at 6 PM, but her schedule changes and she begins to arrive home at 4:30 each day, she is likely to be uncomfortable and either make frequent manual changes or go through the generally non-intuitive process of reprogramming the thermostat to match her new schedule. Because the limited interface on most thermostats, that process may take considerable effort, which leads many users to avoid reprogramming their thermostats for long periods or even to skip doing so entirely.

But even if a homeowner is able to align her schedule with the programming of her thermostat, there are additional difficulties associated with choosing proper temperatures at those times. If the temperatures programmed into a thermostat do not accurately reflect the preferences of the occupants, those occupants are likely to resort to manual overrides of the programmed settings. The need to correct the "mistakes" of the thermostat is likely to annoy many users. And because people tend to overshoot the desired temperature when they make such manual changes, these overrides are likely to result in excessive heating and cooling, and thus unnecessary energy use. That is, if a person feels uncomfortable on a summer afternoon when the setting is 73 degrees, they are likely to change it to 68 or 69 rather than 71 or 72 degrees, even if 72 degrees might have made enough of a difference.

It would therefore be advantageous to have a means for adapting to signaling from occupants in the form of manual temperature changes and incorporating the information contained in such gestures into long-term programming. It would also be desirable to take into account both outside weather conditions and the thermal characteristics of individual homes in order to improve the ability to dynamically achieve the best possible balance between comfort and energy savings.

BRIEF DESCRIPTION OF THE DRAWINGS

FIG. 10 shows an example of some of the contextual data that may be used by the server in order to interpret manual overrides.

DETAILED DESCRIPTION OF THE PREFERRED EMBODIMENT

Figure 1:
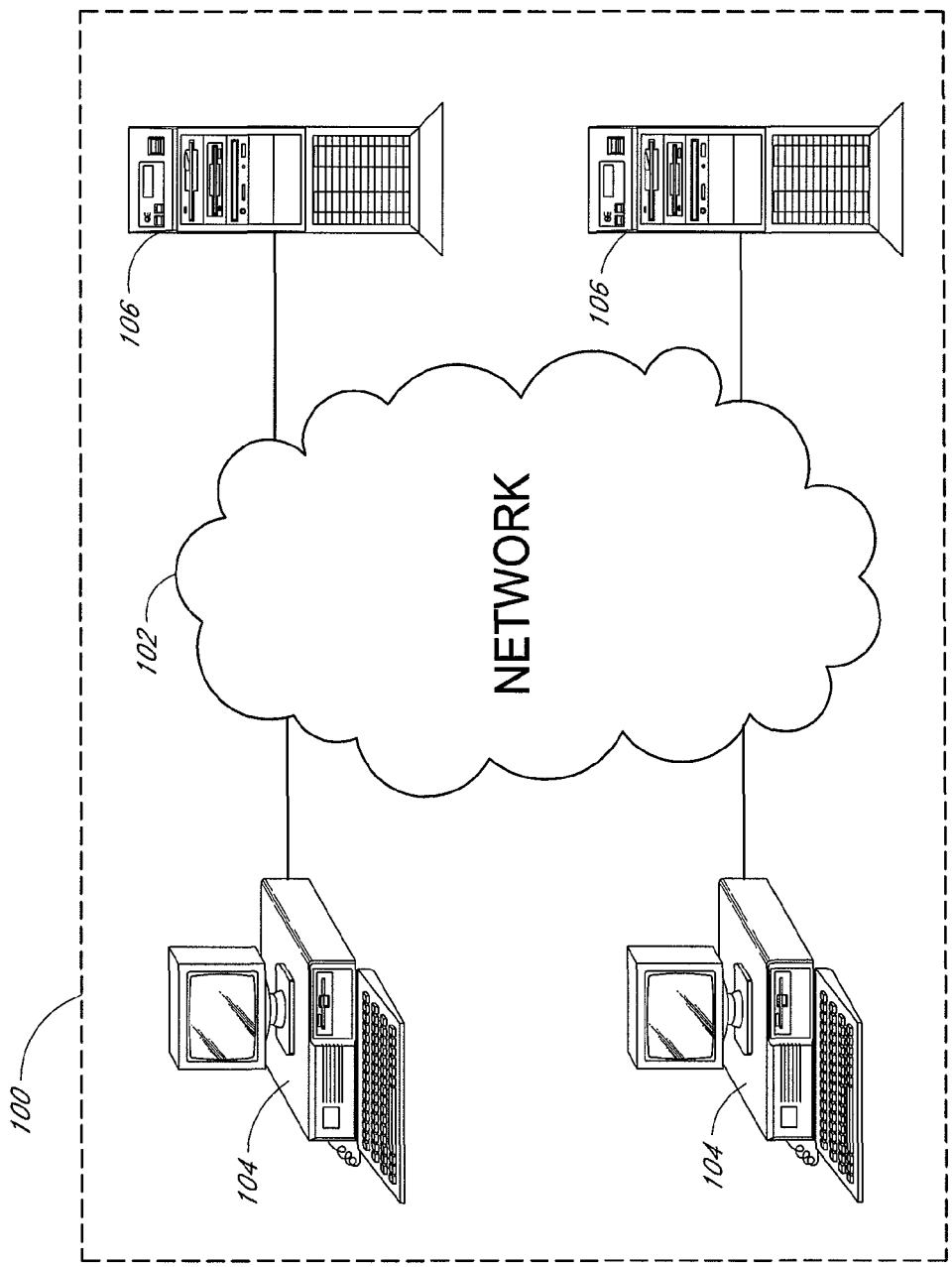
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

One popular part of the Internet is the World Wide Web. The World Wide Web contains a large number of computers 104 and servers 106, which store HyperText Markup Language (HTML) and other documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

Network 102 can also comprise servers 106 that provide services other than HTML documents. Such services may include the exchange of data with a wide variety of "edge" devices, some of which may not be capable of displaying web pages, but that can record, transmit and receive information.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 may utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
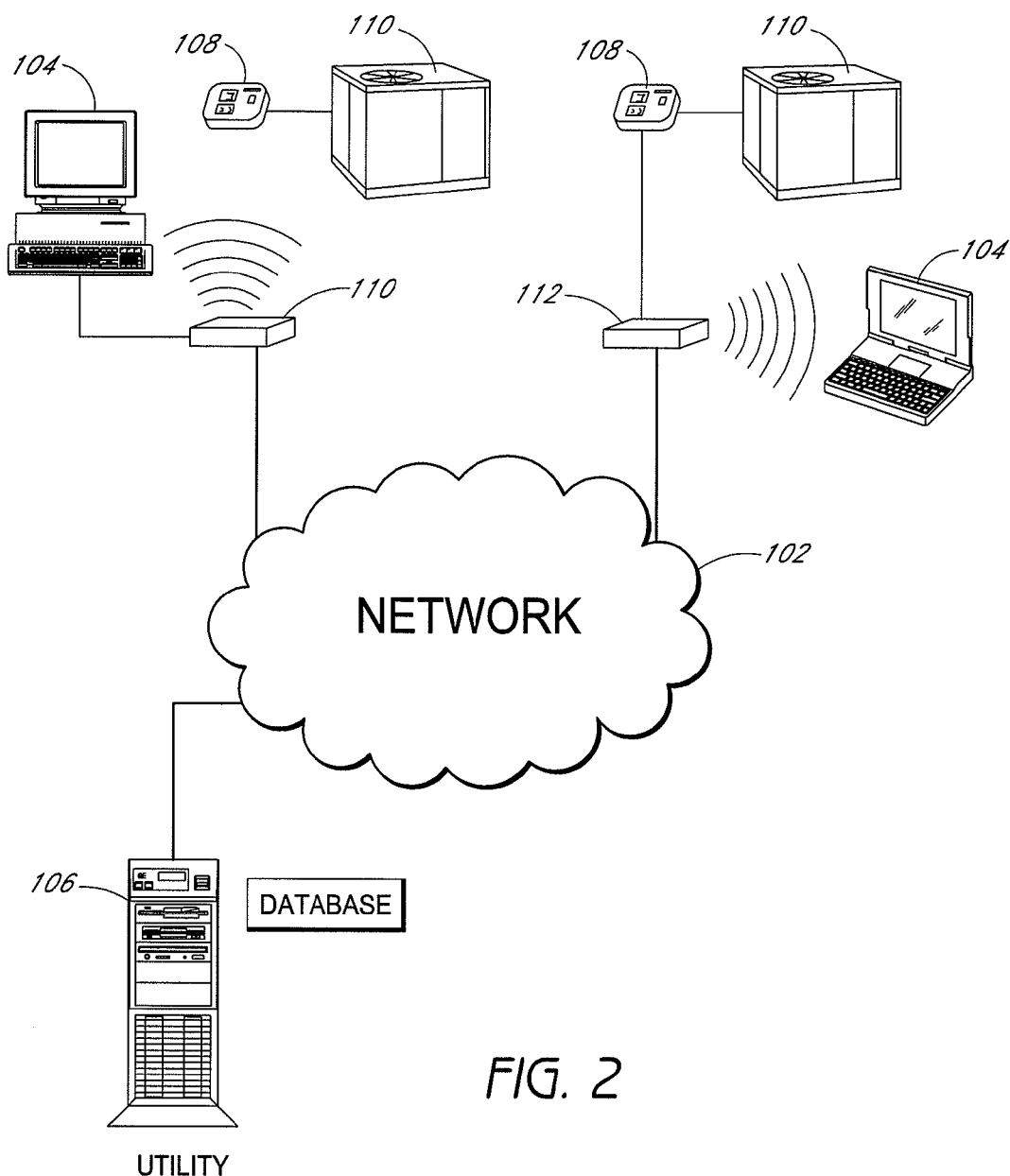
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user may be connected to server 106 via wired or wireless connection such as Ethernet or a wireless protocol such as IEEE 802.11, and router and/or gateway or wireless access point 112 that connects the computer and thermostat to the Internet via a broadband connection such as a digital subscriber line (DSL) or other form of broadband connection to the World Wide Web. In one embodiment, thermostat management server 106 is in communication with the network 102. Server 106 contains the content to be served as web pages and viewed by computers 104, as well as databases containing information used by the servers, and applications used to remotely manage thermostats 108.

Figure 3:
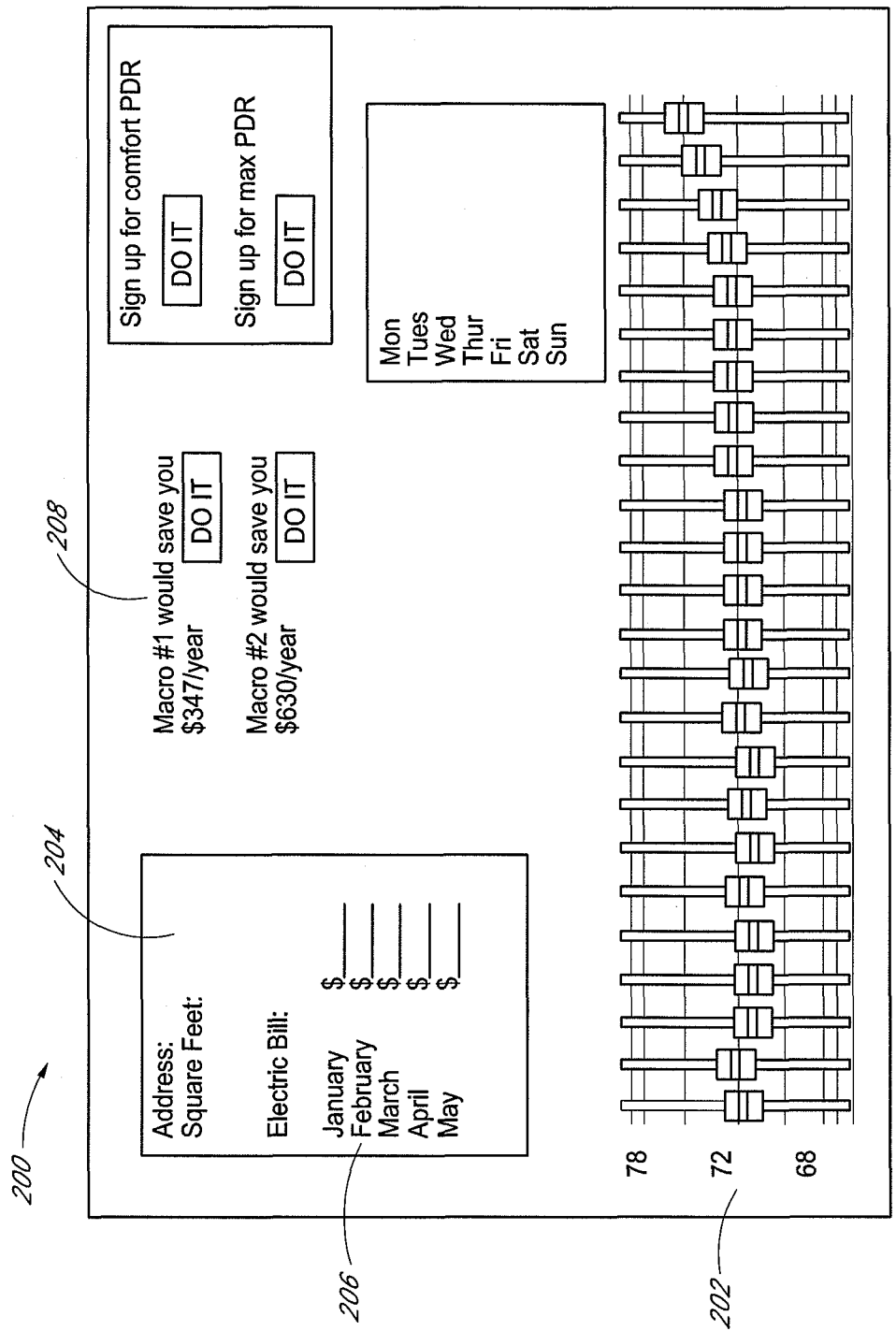
FIG. 3 shows an embodiment of the website to be used as part of the subject invention.

In the currently preferred embodiment, the website 200 includes a number of components accessible to the user, as shown in FIG. 3. Those components may include a means to store temperature settings 202, a means to enter information about the user's home 204, a means to enter the user's electricity bills 206, and means to elect to enable the subject invention 208.

Figure 4:
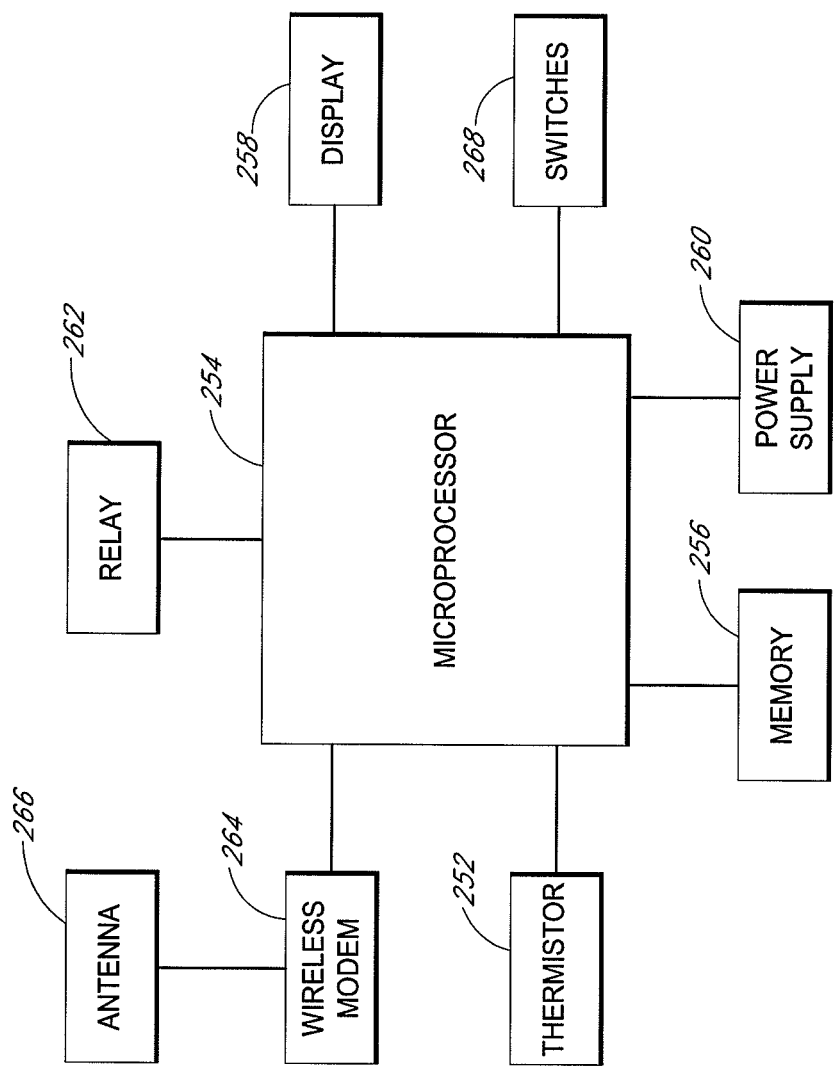
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, and at least one relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wired or wireless network. Such means could be in the form of Ethernet, wireless protocols such as IEEE 802.11, IEEE 802.15.4, Bluetooth, or other wireless protocols. The thermostat may be connected to the computer network directly via wired or wireless Internet Protocol connection. Alternatively, the thermostat may connect wirelessly to a gateway such as an IP-to-Zigbee gateway, an IP-to-Z-wave gateway, or the like. Where the communications means enabled include wireless communication, antenna 266 will also be included. The thermostat 250 may also include controls 268 allowing users to change settings directly at the thermostat, but such controls are not necessary to allow the thermostat to function.

Figure 5:
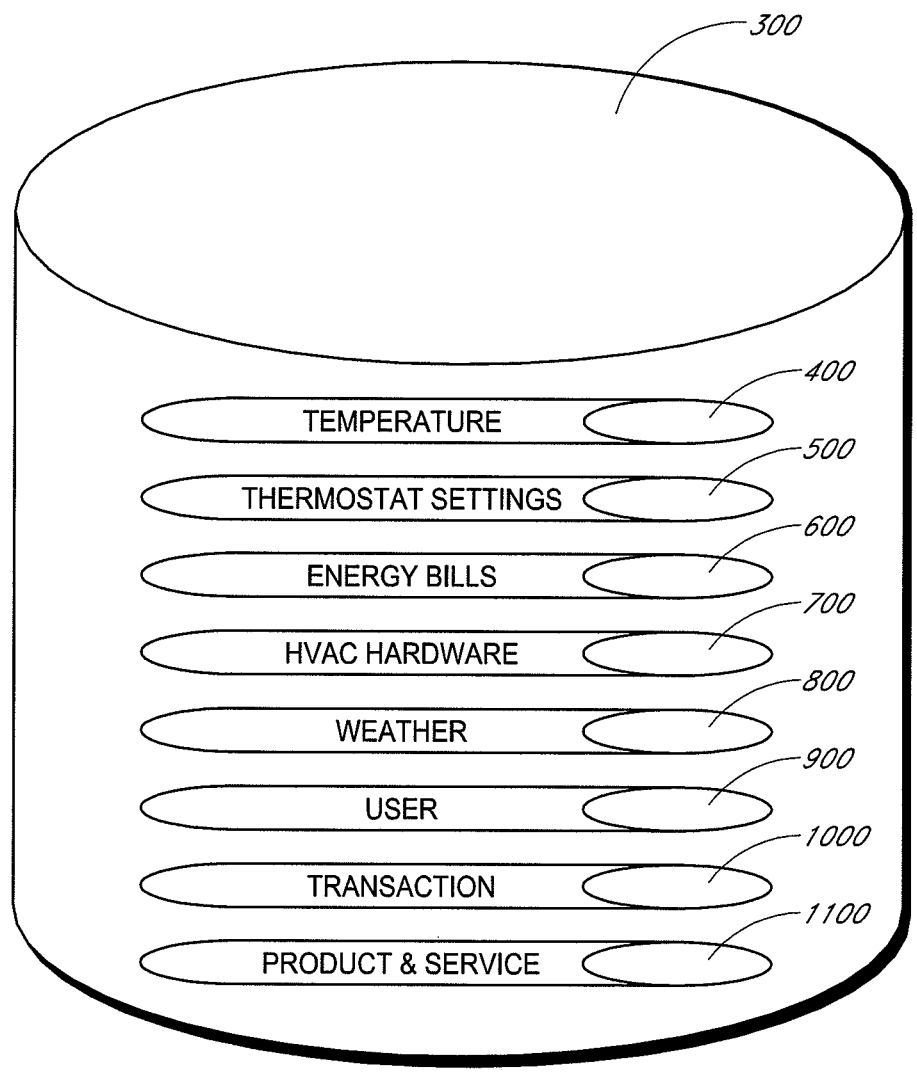
FIG. 5 shows one embodiment of the database structure used as part of the subject invention.

The data used to generate the content delivered in the form of the website and to automate control of thermostat 108 is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website will allow users of connected thermostats 108 to create personal accounts. Each user's account will store information in database 900, which tracks various attributes relative to users. Such attributes may include the make and model of the specific HVAC equipment in the user's home; the age and square footage of the home, the solar orientation of the home, the location of the thermostat in the home, the user's preferred temperature settings, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

Figure 6A:
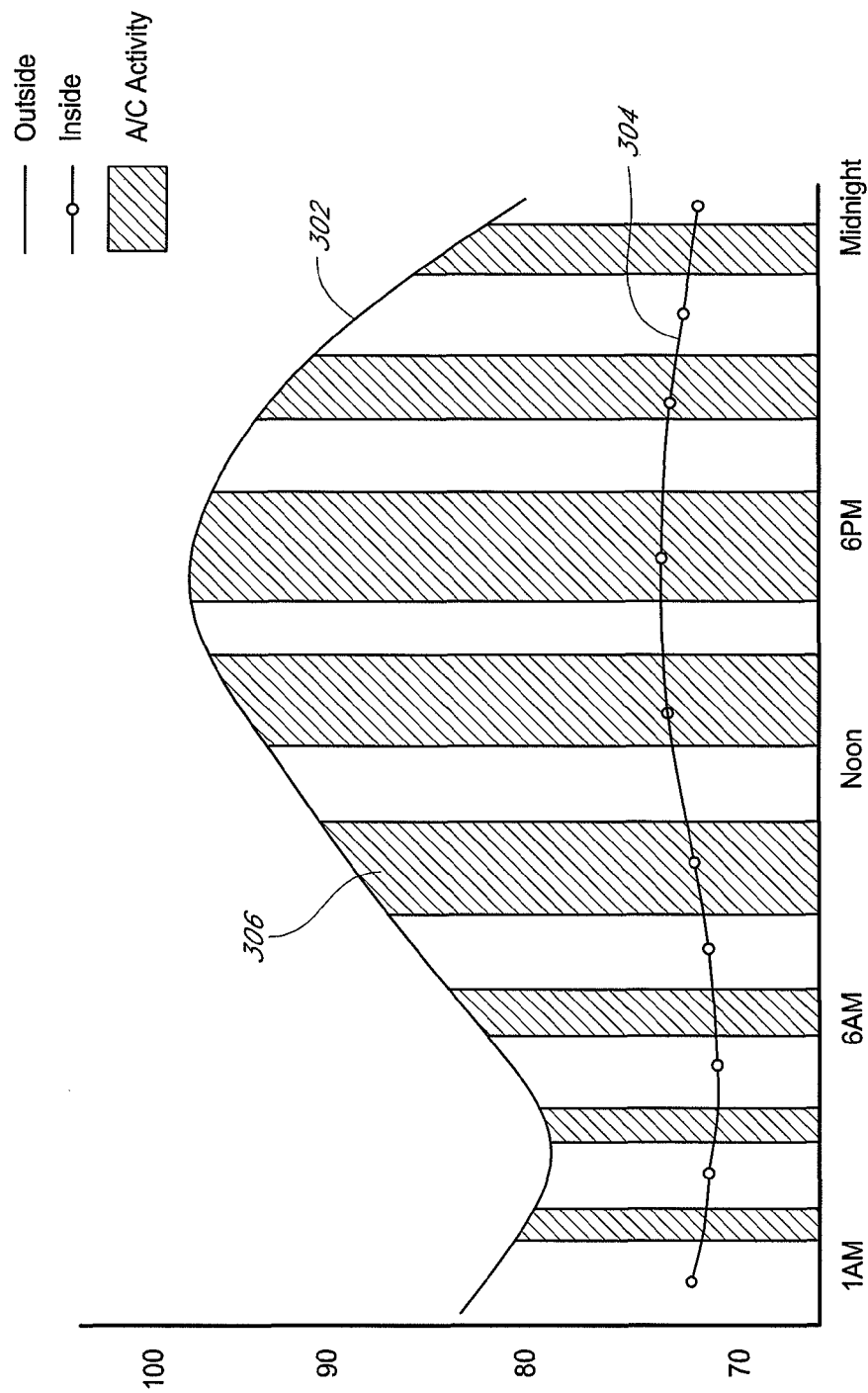
FIG. 6 shows how comparing inside temperature against outside temperature and other variables permits calculation of dynamic signatures.

For example, FIG. 6a shows a graph of inside temperature, outside temperature and HVAC activity for a 24-hour period. When outside temperature 302 increases, inside temperature 304 follows, but with some delay because of the thermal mass of the building, unless the air conditioning 306 operates to counteract this effect. When the air conditioning turns on, the inside temperature stays constant (or rises at a much lower rate or even falls) despite the rising outside temperature. In this example, frequent and heavy use of the air conditioning results in only a very slight temperature increase inside the house of 4 degrees, from 72 to 76 degrees, despite the increase in outside temperature from 80 to 100 degrees.

Figure 6B:
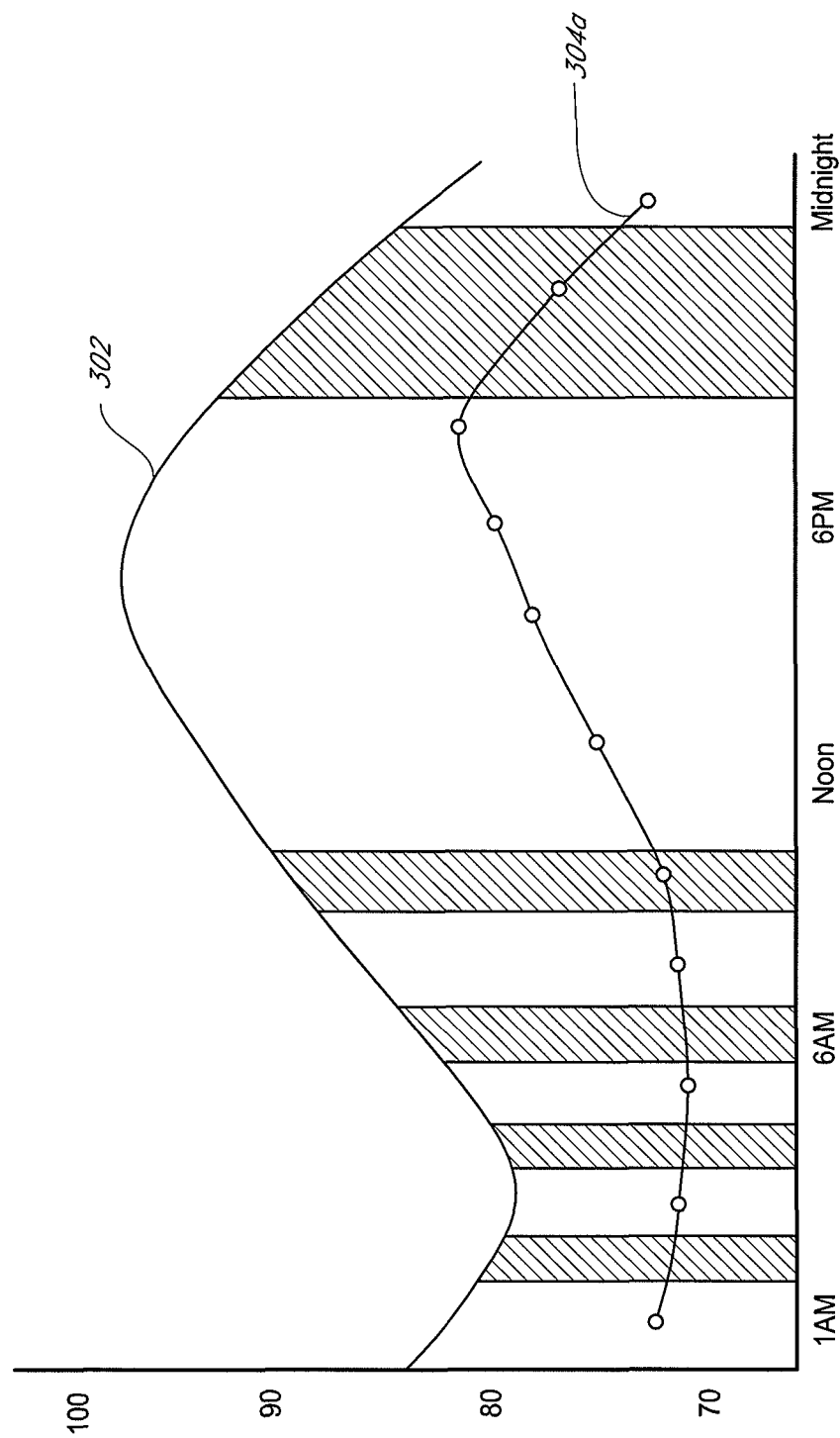

FIG. 6b shows a graph of the same house on the same day, but assumes that the air conditioning is turned off from noon to 7 PM. As expected, the inside temperature 304a rises with increasing outside temperatures 302 for most of that period, reaching 88 degrees at 7 PM. Because server 106 logs the temperature readings from inside each house (whether once per minute or over some other interval), as well as the timing and duration of air conditioning cycles, database 300 will contain a history of the thermal performance of each house. That performance data will allow server 106 to calculate an effective thermal mass for each such structure—that is, the speed with the temperature inside a given building will change in response to changes in outside temperature. Because the server will also log these inputs against other inputs including time of day, humidity, etc. the server will be able to predict, at any given time on any given day, the rate at which inside temperature should change for given inside and outside temperatures.

The ability to predict the rate of change in inside temperature in a given house under varying conditions may be applied by in effect holding the desired future inside temperature as a constraint and using the ability to predict the rate of change to determine when the HVAC system must be turned on in order to reach the desired temperature at the desired time.

In order to adapt programming to take into account the manual overrides entered into the thermostat, it is first necessary to determine when a manual override has in fact occurred. Most thermostats, including two-way communicating devices discussed herein, do not record such inputs locally, and neither recognize nor transmit the fact that a manual override has occurred. Furthermore, in a system as described herein, frequent changes in setpoints may be initiated by algorithms running on the server, thereby making it impossible to infer a manual override from the mere fact that the setpoint has changed. It is therefore necessary to deduce the occurrence of such events from the data that the subject invention does have access to.

Figure 7:
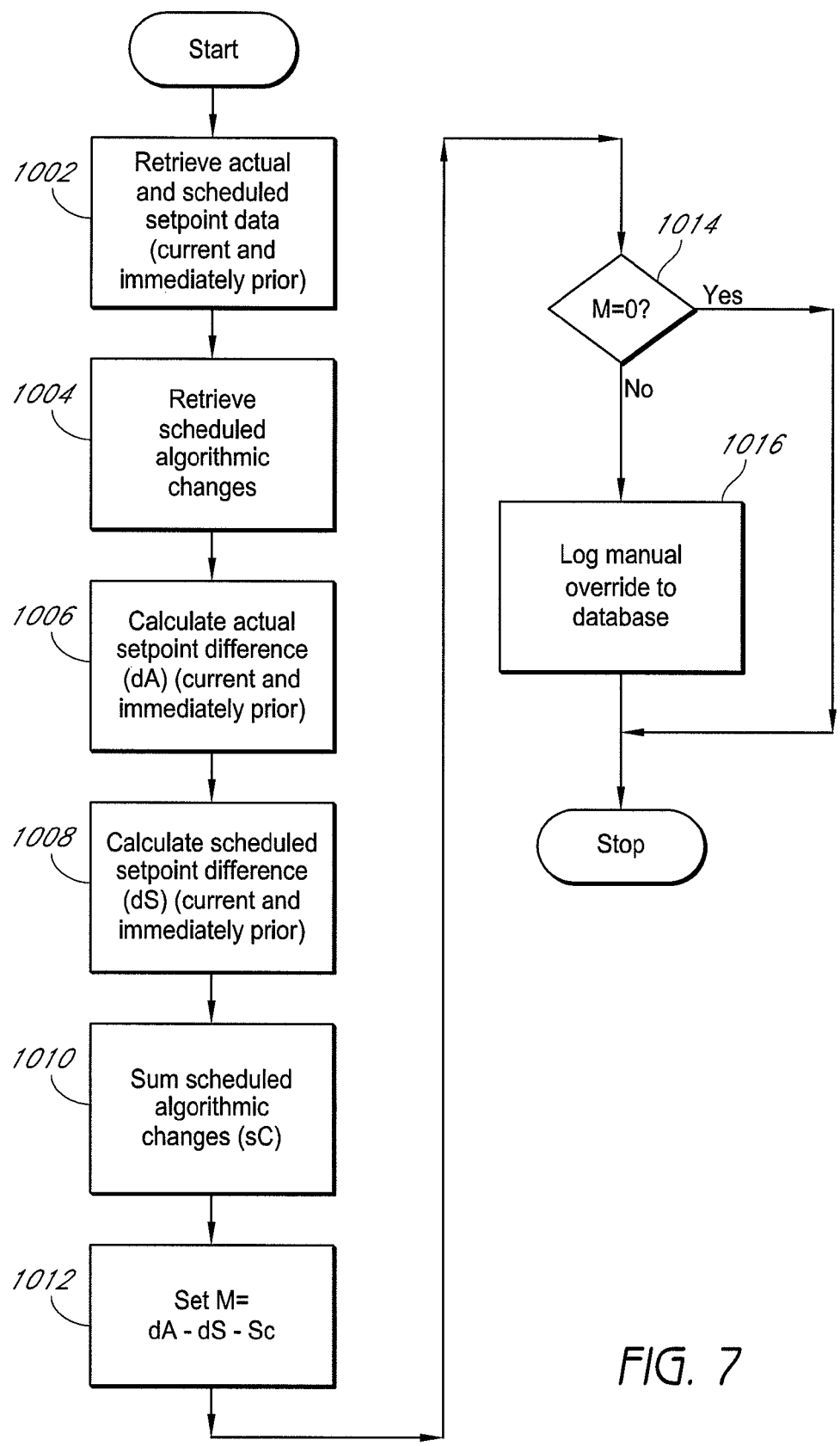
FIG. 7 shows how manual inputs can be recognized and recorded by the subject invention.

FIG. 7 illustrates the currently preferred method for detecting the occurrence of a manual override event. In step 1002, the server retrieves the primary data points used to infer the occurrence of a manual override from one or more databases in overall database structure 300. The data should include each of the following: for the most recent point for which it can obtain such data (time0) the actual setpoint as recorded at the thermostat (A0); for the point immediately prior to time0, (time−1), the actual setpoint recorded for the thermostat (A−1); for time0 the setpoint as scheduled by server 106 according to the standard setpoint programming (S0), and for time0 the setpoint as scheduled by server 106 according to the standard setpoint programming (S−1). In step 1004, the server retrieves any additional automated setpoint changes C that have been scheduled for the thermostat by server 106 at time0. Such changes may include algorithmic changes intended to reduce energy consumption, etc. In step 1006 the server calculates the difference (dA) between A0 and A−1; for example, if the setpoint at T0 is 67 degrees at T−1 and 69 at T0, dA is +2; if the setpoint at T−1 is 70 and the setpoint at T0 is 66, dA is −4. In step 1008, the server performs similar steps in order to calculate dS, the difference between S0 and S−1. This is necessary because, for example, the setpoint may have been changed because the server itself had just executed a change, such as a scheduled change from "away" to "home" mode. In step 1010 the server evaluates and sums all active algorithms and other server-initiated strategies to determine their net effect on setpoint at time0. For example, if one algorithm has increased setpoint at time0 by 2 degrees as a short-term energy savings measure, but another algorithm has decreased the setpoint by one degree to compensate for expected subjective reactions to weather conditions, the net algorithmic effect sC is +1 degree.

In step 1012, the server calculates the value for M, where M is equal to the difference between actual setpoints dA, less the difference between scheduled setpoints dS, less the aggregate of algorithmic change sC. In step 1014 the server evaluates this difference. If the difference equals zero, the server concludes that no manual override has occurred, and the routine terminates. But if the difference is any value other than zero, then the server concludes that a manual override has occurred. Thus in step 1016 the server logs the occurrence of an override to one or more databases in overall database structure 300.

Figure 8:
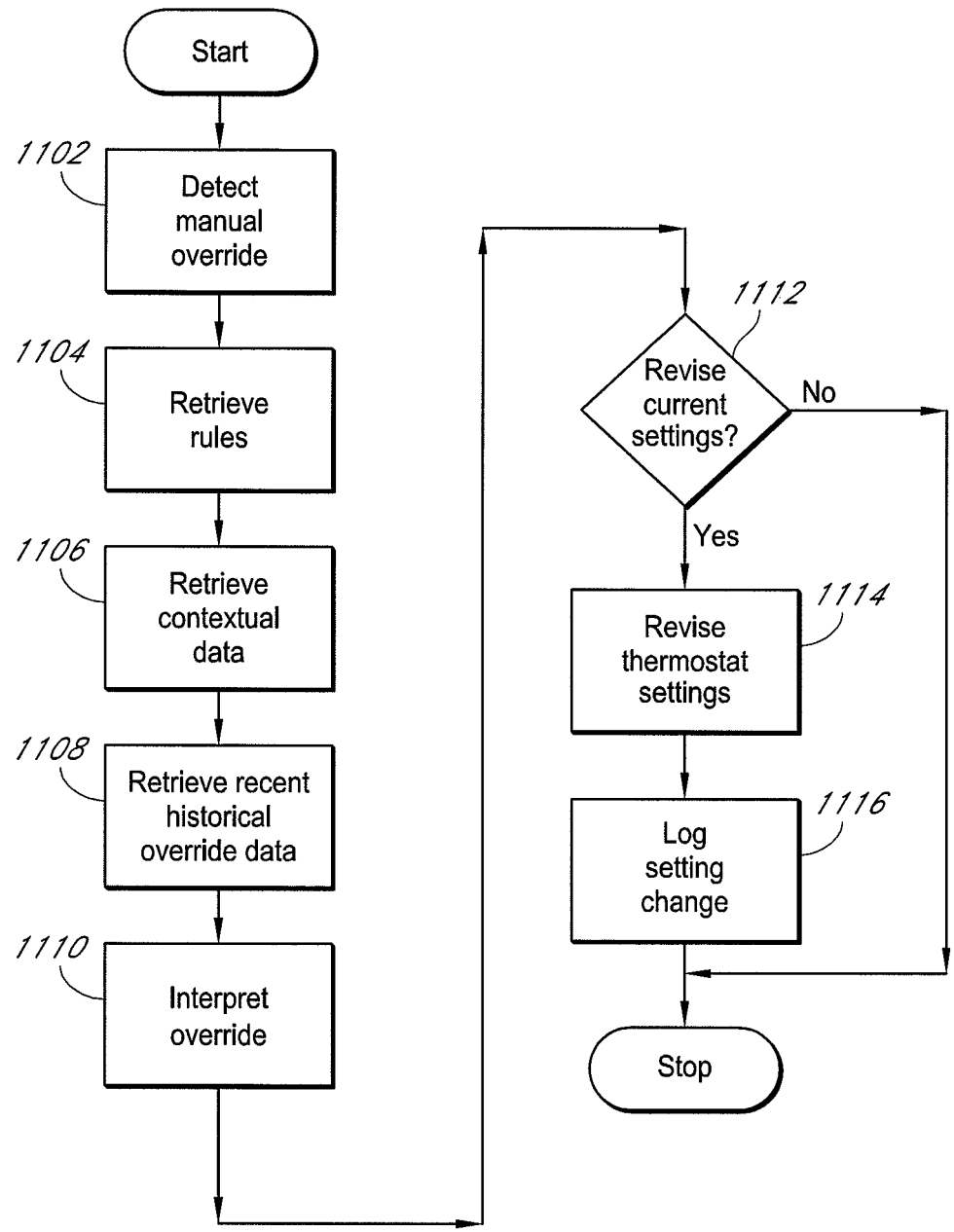
FIG. 8 shows how the subject invention uses manual inputs to interpret manual overrides and make short-term changes in response thereto.

The process of interpreting a manual override is shown in FIG. 8. 1102 is the detection of an override, as described in detail in FIG. 7 In step 1104 the server retrieves contextual data required to interpret the manual override. Such data may include current and recent weather conditions, current and recent inside temperatures, etc. This data is helpful because it is likely that manual overrides are at least in part deterministic: that is, that they may often be explained by such contextual data, and that such understanding can permit anticipation of the desire on the part of the occupants to override and to adjust programming accordingly, so as to anticipate and obviate the need for such changes. In step 1106 the server retrieves any override data from the period preceding the specific override being evaluated that has not yet been evaluated by and incorporated into the long-term programming and rules engines as described below in FIG. 9. The amount of data may be for a period of a few hours to as long as several days or more. Recent data will be more heavily weighted than older data in order to assure rapid adaptation to situations in which manual overrides represent stable changes such as changes in work schedules, etc. In step 1108 the server retrieves the stored rules for the subject thermostat 108. Such rules may include weather and time-related inferences such as "if outside temperature is greater than 85 degrees and inside temperature is more than 2 degrees above setpoint and manual override lowers setpoint by 3 or more degrees, then revert to original setpoint in 2 hours," or "if heating setpoint change is scheduled from "away" to "home" within following 2 hours after detected override, and override increases setpoint by at least 2 degrees, then change to "home" setting," or the like. In step 1110 the server applies the rules to the override and determines which rule, if any, should be applied as a result of the override. In step 1112 the server determines whether to alter the current setpoint as a result of applying the rules in step 1110. If no setpoint change is indicated, then the server proceeds to step 1118. If a setpoint change is indicated, then in step 1114 the server transmits the setpoint change to the thermostat, and in step 1116 it records that change to one or more databases in overall database structure 300.

Figure 9:
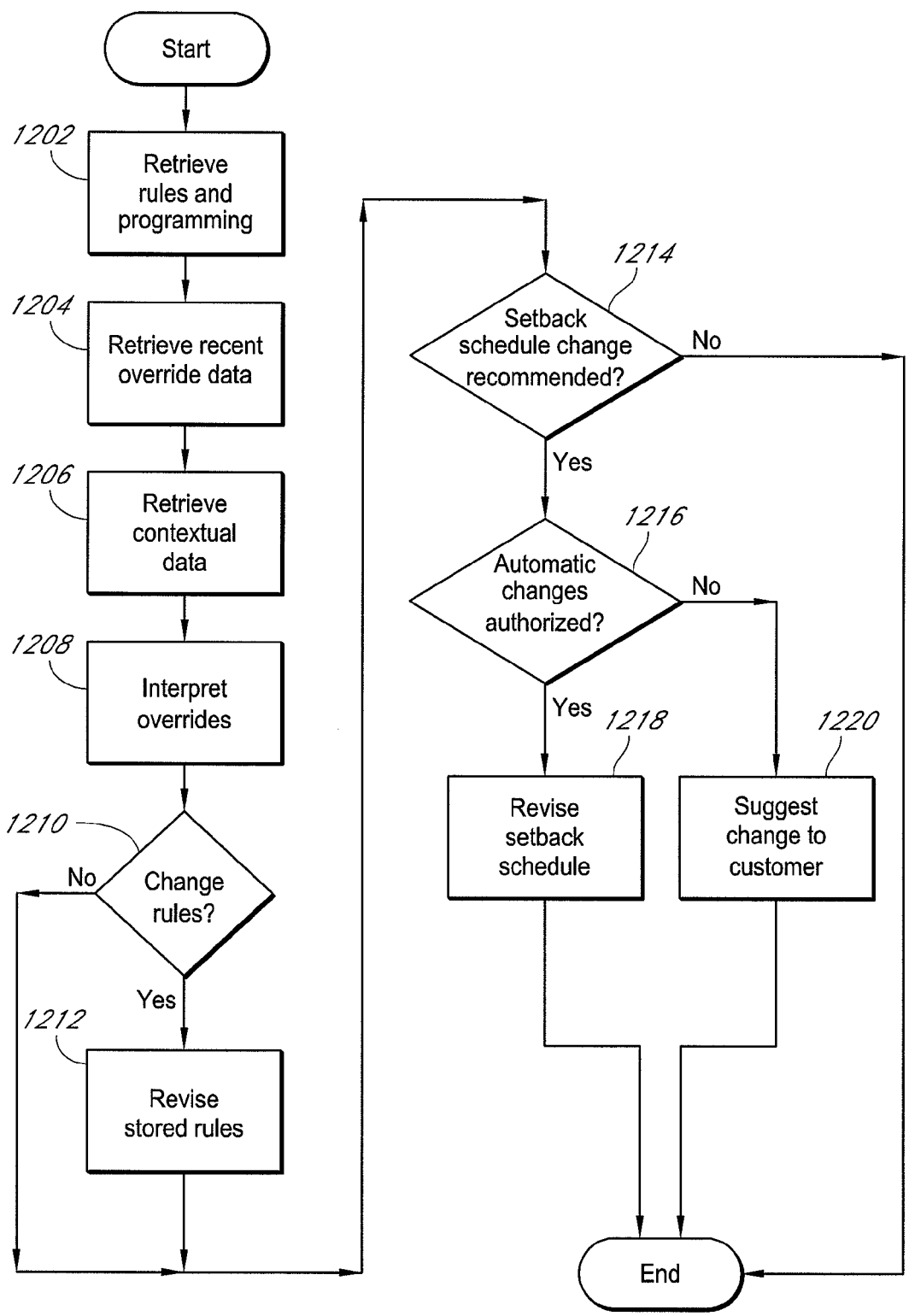
FIG. 9 shows how the subject invention uses manual inputs to alter long-term changes to interpretive rules and to setpoint scheduling.

In order to ensure that both the stored rules for interpreting manual overrides and the programming itself continue to most accurately reflect the intentions of the occupants, the server will periodically review both the rules used to interpret overrides and the setpoint scheduling employed. FIG. 9 shows the steps used to incorporate manual overrides into the long-term rules and setpoint schedule. In step 1202 the server retrieves the stored programming for a given thermostat as well as the rules for interpreting overrides for that thermostat. In step 1204 the server retrieves the recent override data as recorded in FIGS. 7 and 8 to be evaluated for possible revisions to the rules and the programming. In step 1206 the server retrieves the contextual data regarding overrides retrieved in step 1204 (Because the process illustrated in FIG. 9 is not presently expected to be executed as a real-time process, and to be run anywhere from once per day to once per month, the range and volume of contextual data to be evaluated is likely to be greater than in the process illustrated in FIG. 8). In step 1208 the server interprets the overrides in light of the existing programming schedule, rules for overrides, contextual data, etc. In step 1210 the server determines whether, as a result of those overrides as interpreted, the rules for interpreting manual overrides should be revised. If the rules are not to be revised, the server moves to step 1214. If the rules are to be revised, then in step 1212 the server revises the rules and the new rules are stored in one or more databases in overall database structure 300. In step 1214 the server determines whether any changes to the baseline programming for the thermostat should be revised. If not the routine terminates. If revisions are warranted, then in step 1216 the server retrieves from database 900 the permissions the server has to make autonomous changes to settings. If the server has been given permission to make the proposed changes, then in step 1218 the server revises the thermostat's programming and writes the changes to one or more databases in overall database structure 300. If the server has not been authorized to make such changes autonomously, then in step 1220 the server transmits the recommendation to change settings to the customer in the manner previously specified by the customer, such as email, changes to the customer's home page as displayed on website 200, etc.

FIG. 10 shows an example of some of the contextual data that may be used by the server in order to interpret manual overrides. Such data may include inside temperature 1302, outside temperature 1304, cloud cover 1306, humidity 1308, barometric pressure 1310, wind speed 1312, and wind direction 1314.

Each of these data points should be captured at frequent intervals. In the preferred embodiment, as shown in FIG. 10, the interval is once every 60 seconds.

Additional means of implementing the instant invention may be achieved using variations in system architecture. For example, much or even all of the work being accomplished by remote server 106 may also be done by thermostat 108 if that device has sufficient processing capabilities, memory, etc. Alternatively, some or all of these steps may be undertaken by a local processor such as a local personal computer, gateway 112, or by a dedicated appliance having the requisite capabilities.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for detecting manual changes to the setpoint for a thermostatic controller comprising:
   accessing stored data comprising a plurality of internal temperature measurements taken within a structure and a plurality of outside temperature measurements relating to temperatures outside the structure;
   using the stored data to predict a rate of change of temperatures inside the structure in response to at least changes in outside temperatures;
   calculating with one or more computer processors, scheduled programming of the thermostatic controller for one or more times based on the predicted rate of change, the scheduled programming comprising at least a first automated setpoint at a first time;
   generating with one or more computer processors, a difference value based on comparing an actual setpoint at the first time for said thermostatic controller to the first automated setpoint for said thermostatic controller;
   detecting a manual change to the first automated setpoint by determining whether said actual setpoint and said first automated setpoint are the same or different based on said difference value; and
   logging said manual change to a database associated with the thermostatic controller.

2. A method as in claim 1 where said thermostatic controller operates a system for changing the air temperature in a structure.

3. A method as in claim 1 where said thermostatic controller operates a heating, ventilation and air conditioning system.

4. A method as in claim 1 where said thermostatic controller operates a heating, ventilation and air conditioning system in a single family residence.

5. A method as in claim 1 in which at least one remote processor is in communication with said thermostatic control device.

6. A method as in claim 5 in which said remote processor is not located in the same structure as said thermostatic controller.

7. A method as in claim 5 in which said remote processor sets programming for said thermostatic controller.

8. A method as in claim 1 in which said thermostatic controller is programmable.

9. A method for incorporating manual changes to the setpoint for a thermostatic controller into long-term programming of said thermostatic controller comprising:
   accessing stored data comprising a plurality of internal temperature measurements taken within a structure and a plurality of outside temperature measurements relating to temperatures outside the structure;
   using the stored data to predict a rate of change of temperatures inside the structure in response to at least changes in outside temperatures;
   calculating scheduled programming of setpoints in the thermostatic controller based on the predicted rate of change, the scheduled programming comprising at least a first automated setpoint at a first time and a second automated setpoint at a second time;
   comparing the actual setpoint at the first time for said thermostatic controller to the first automated setpoint for said thermostatic controller;

detecting a manual change to the first automated setpoint by determining whether said actual setpoint and said first automated setpoint are the same or different;

changing the second automated setpoint at the second time based on at least one rule for the interpretation of said manual change.

10. A method as in claim 9 where said thermostatic controller operates a system for changing the air temperature in a structure.

11. A method as in claim 9 where said thermostatic controller operates a heating, ventilation and air conditioning system.

12. A method as in claim 9 where said thermostatic controller operates a heating, ventilation and air conditioning system in a single family residence.

13. A method as in claim 9 in which at least one remote processor is in communication with said thermostatic control device.

14. A method as in claim 13 in which said remote processor is not located in the same structure as said thermostatic controller.

15. A method as in claim 13 in which said remote processor sets programming for said thermostatic controller.

16. A system as in claim 9 in which said thermostatic controller is programmable.

17. An apparatus for detecting manual changes to the setpoint for a thermostatic controller comprising:

at least a programmable communicating thermostat;

at least a remote processor;

at least a network connecting said remote processor and said communicating;

at least a database comprising a plurality of internal temperature measurements taken within a structure and a plurality of outside temperature measurements relating to temperatures outside the structure;

computer hardware comprising one or more computer processors configured to use the stored data to predict a rate of change of temperatures inside the structure in response to changes in outside temperatures;

the one or more computer processors configured to calculate scheduled setpoint programming of the programmable communicating thermostat for one or more times based on the predicted rate of change, the scheduled programming comprising one or more automated setpoints;

at least a database that stores the one or more automated setpoints associated with the scheduled programming for said programmable communicating thermostat;

at least a database that stores actual setpoint programming of said programmable communicating thermostat; and the one or more computer processors configured to compare the one or more automated setpoints associated with said scheduled setpoint programming with said actual setpoint programming.

18. An apparatus as in claim 17 where said programmable communicating thermostat operates a system for changing the air temperature in a structure.

19. An apparatus as in claim 17 where said programmable communicating thermostat operates a heating, ventilation and air conditioning system.

20. An apparatus as in claim 17 where said programmable communicating thermostat operates a heating, ventilation and air conditioning system in a single family residence.

21. An apparatus as in claim 20 in which at least one remote processor is in communication with said programmable communicating thermostat.

22. An apparatus as in claim 20 in which said remote processor is not located in the same structure as said programmable communicating thermostat.

23. An apparatus as in claim 20 in which said remote processor sets programming for said programmable communicating thermostat.

* * * * *